United States Patent
D'Souza et al.

(10) Patent No.: US 10,460,030 B2
(45) Date of Patent: *Oct. 29, 2019

(54) GENERATING STRUCTURED MEETING REPORTS THROUGH SEMANTIC CORRELATION OF UNSTRUCTURED VOICE AND TEXT DATA

(71) Applicant: International Business Machines Corporation, Armonk, NY (US)

(72) Inventors: Pidad G. D'Souza, Bangalore (IN); Anto A. R. John, Trichy (IN); Josephine E. Justin, Bangalore (IN); Saritha Vinod, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 221 days.

This patent is subject to a terminal disclaimer.

(21) Appl. No.: 14/825,602

(22) Filed: Aug. 13, 2015

(65) Prior Publication Data

US 2017/0046331 A1 Feb. 16, 2017

(51) Int. Cl.
*G06F 17/27* (2006.01)
*G06F 16/34* (2019.01)
(Continued)

(52) U.S. Cl.
CPC .......... *G06F 17/277* (2013.01); *G06F 16/258* (2019.01); *G06F 16/34* (2019.01);
(Continued)

(58) Field of Classification Search
CPC .............. G06F 17/277; G06F 17/2785; G06F 17/30569; G06F 17/30716; G06F 16/258;
(Continued)

(56) References Cited

U.S. PATENT DOCUMENTS 5,799,315 A   8/1998   Rainey et al.
7,260,771 B2  8/2007   Chiu et al.
(Continued)

FOREIGN PATENT DOCUMENTS

WO   2012158177 A1   11/2012

OTHER PUBLICATIONS

Blackboard, "Blackboard Collaborate On-Demand Learning Center," Blackboard Collaborate Services, 2015, p. 1-2, http://www.blackboard.com/Platforms/Collaborate/Services/On-Demand-Learning-Center.aspx, Accessed on May 1, 2015.
(Continued)

*Primary Examiner* — Walter Yehl
(74) *Attorney, Agent, or Firm* — Kenneth Han

(57) ABSTRACT

Generating reports. The method may include receiving, by a computer, data associated with a meeting. The method may include converting the received data to audio text data, digital text data, and graphical object data. The method may include identifying tokens associated with the converted audio text data, the converted digital text data, and the converted graphical object data. The method may include integrating each token corresponding to timeline data, positional data, and structural data. The method may include creating semantic correlations by connecting tokens associated with the converted audio text data and tokens associated with the converted digital text data. The method may include associating each of the integrated tokens with a semantic correlation based on the timeline data. The method may include creating a report outline based on the received data. The method may include creating an integrated report using the created report outline and the associated tokens.

13 Claims, 9 Drawing Sheets

(51) Int. Cl.
  *G06F 16/25*  (2019.01)
  *G06K 9/46*  (2006.01)
  *G06K 9/32*  (2006.01)
  *G06F 17/28*  (2006.01)
  *G10L 15/26*  (2006.01)

(52) U.S. Cl.
  CPC ........ *G06F 17/279* (2013.01); *G06F 17/2745* (2013.01); *G06F 17/2785* (2013.01); *G06F 17/28* (2013.01); *G06K 9/3233* (2013.01); *G06K 9/46* (2013.01); *G10L 15/26* (2013.01)

(58) Field of Classification Search
  CPC .... G06F 16/34; G06F 17/2745; G06F 17/279; G06F 17/28; G10L 15/26; G06K 9/3233; G06K 9/46
  See application file for complete search history.

(56) References Cited

U.S. PATENT DOCUMENTS

| | | | | |
|---|---|---|---|---|
| 7,596,755 | B2* | 9/2009 | Graham | G06F 16/40 715/723 |
| 7,606,444 | B1* | 10/2009 | Erol | G06K 9/00711 382/305 |
| 7,711,722 | B1* | 5/2010 | Sahasi | G06F 16/4393 707/705 |
| 8,812,510 | B2 | 8/2014 | Romanov et al. | |
| 8,892,652 | B2 | 11/2014 | Beerse et al. | |
| 9,195,640 | B1* | 11/2015 | Donneau-Golencer | H04M 3/56 370/260 |
| 2002/0161804 | A1* | 10/2002 | Chiu | G06Q 10/10 715/201 |
| 2004/0064322 | A1* | 4/2004 | Georgiopoulos | G10L 15/26 704/277 |
| 2006/0100877 | A1 | 5/2006 | Zhang et al. | |
| 2007/0133437 | A1* | 6/2007 | Wengrovitz | H04M 3/56 370/260 |
| 2009/0271438 | A1* | 10/2009 | Agapi | G06Q 10/109 |
| 2011/0099006 | A1 | 4/2011 | Sundararaman et al. | |
| 2011/0208522 | A1* | 8/2011 | Pereg | G06F 17/279 704/235 |
| 2012/0296914 | A1* | 11/2012 | Romanov | G11B 27/034 707/741 |
| 2012/0321062 | A1* | 12/2012 | Fitzsimmons | H04M 65/4015 379/142.17 |
| 2013/0113804 | A1 | 5/2013 | Ferman et al. | |
| 2013/0144603 | A1* | 6/2013 | Lord | H04L 12/1831 704/9 |
| 2013/0191452 | A1* | 7/2013 | Beerse | H04L 65/403 709/204 |
| 2013/0253910 | A1* | 9/2013 | Turner | G06F 17/274 704/9 |
| 2014/0161416 | A1* | 6/2014 | Chou | G06F 16/4393 707/705 |
| 2015/0135067 | A1* | 5/2015 | Ellis | G06F 16/40 715/723 |

OTHER PUBLICATIONS

Bush, "Speech and Text-Image Processing in Documents," HLT '93 Proceedings of the Workshop on Human Language Technology, 1993, p. 376-380, Xerox Palo Alto Research Center.

IBM, "Emotion Video Analytics 1.0," IBM PartnerWorld Global Solutions Directory, Last Modified: Jul. 1, 2013, http://www-304.ibm.com/partnerworld/gsd/solutiondetails.do?solution=45166&lc=en&stateCd=P&tab=2#ti, Accessed on May 1, 2015.

Mell et al., "The NIST Definition of Cloud Computing," National Institute of Standards and Technology, Sep. 2011, p. 1-3, Special Publication 800-145.

IBM, "List of IBM Patents or Patent Applications Treated as Related (Appendix P)," Sep. 28, 2015, p. 1-2.

D'Souza et al., "Generating Structured Meeting Reports Through Semantic Correlation of Unstructured Voice and Text Data," Application and Drawings, Filed on Sep. 28, 2015, 40 Pages, U.S. Appl. No. 14/867,140.

* cited by examiner

GENERATING STRUCTURED MEETING REPORTS THROUGH SEMANTIC CORRELATION OF UNSTRUCTURED VOICE AND TEXT DATA

FIELD OF INVENTION

The present invention relates generally to the field of computing, and more particularly to meetings.

BACKGROUND

Meetings allow participants to collaborate together to share ideas and solve problems. With the expansion of cloud computing, virtual meetings and online meetings are becoming an accessible option to affordably connect meeting participants regardless of the geographical location of each participant. Meeting software, such as IBM® SmartCloud Meetings (IBM and all IBM-based trademarks and logos are trademarks or registered trademarks of International Business Machines Corporation and/or its affiliates), may be utilized to host virtual meetings and online meetings by establishing connections between each meeting participant and allowing participants to interact through various forms, such as a chat room, a video feed of each participant, and an interactive virtual workspace. Meeting software may also allow meeting participants to draw elements, such as freeform text and drawings, in a community interface.

SUMMARY

According to one embodiment, a method for generating reports. The method may include receiving, by a computer, a plurality of data associated with a meeting. The method may also include converting the received plurality of data to at least one of a plurality of audio text data, a plurality of digital text data, and a plurality of graphical object data. The method may further include identifying a plurality of tokens associated with at least one of the converted plurality of audio text data, the converted plurality of digital text data, and the converted plurality of graphical object data. The method may also include integrating each token within the identified plurality of tokens corresponding to at least one of a plurality of timeline data within the received plurality of data, a plurality of positional data within the received plurality of data, and a plurality of structural data within the received plurality of data. The method may further include creating a plurality of semantic correlations by connecting a plurality of tokens associated with the converted plurality of audio text data and a plurality of tokens associated with the converted plurality of digital text data. The method may also include associating each of the integrated tokens with a semantic correlation within the created plurality of semantic correlations based on the plurality of timeline data. The method may further include creating a report outline based on the received plurality of data. The method may also include creating an integrated report using the created report outline and the associated plurality of tokens.

According to another embodiment, a computer system for generating reports. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving, by a computer, a plurality of data associated with a meeting. The computer system may also include converting the received plurality of data to at least one of a plurality of audio text data, a plurality of digital text data, and a plurality of graphical object data. The computer system may further include identifying a plurality of tokens associated with at least one of the converted plurality of audio text data, the converted plurality of digital text data, and the converted plurality of graphical object data. The computer system may also include integrating each token within the identified plurality of tokens corresponding to at least one of a plurality of timeline data within the received plurality of data, a plurality of positional data within the received plurality of data, and a plurality of structural data within the received plurality of data. The computer system may further include creating a plurality of semantic correlations by connecting a plurality of tokens associated with the converted plurality of audio text data and a plurality of tokens associated with the converted plurality of digital text data. The computer system may also include associating each of the integrated tokens with a semantic correlation within the created plurality of semantic correlations based on the plurality of timeline data. The computer system may further include creating a report outline based on the received plurality of data. The computer system may also include creating an integrated report using the created report outline and the associated plurality of tokens.

According to yet another embodiment, a computer program product for generating reports. The computer program product may include one or more computer-readable storage devices and program instructions stored on at least one of the one or me tangible storage devices, the program instructions executable by a processor. The computer program product may include program instructions to receive, by a computer, a plurality of data associated with a meeting. The computer program product may also include program instructions to convert the received plurality of data to at least one of a plurality of audio text data, a plurality of digital text data, and a plurality of graphical object data. The computer program product may further include program instructions to identify a plurality of tokens associated with at least one of the converted plurality of audio text data, the converted plurality of digital text data, and the converted plurality of graphical object data. The computer program product may also include program instructions to integrate each token within the identified plurality of tokens corresponding to at least one of a plurality of timeline data within the received plurality of data, a plurality of positional data within the received plurality of data, and a plurality of structural data within the received plurality of data. The computer program product may further include program instructions to create a plurality of semantic correlations by connecting a plurality of tokens associated with the converted plurality of audio text data and a plurality of tokens associated with the converted plurality of digital text data. The computer program product may also include program instructions to associate each of the integrated tokens with a semantic correlation within the created plurality of semantic correlations based on the plurality of timeline data. The computer program product may further include program instructions to create a report outline based on the received plurality of data. The computer program product may also include program instructions to create an integrated report using the created report outline and the associated plurality of tokens.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
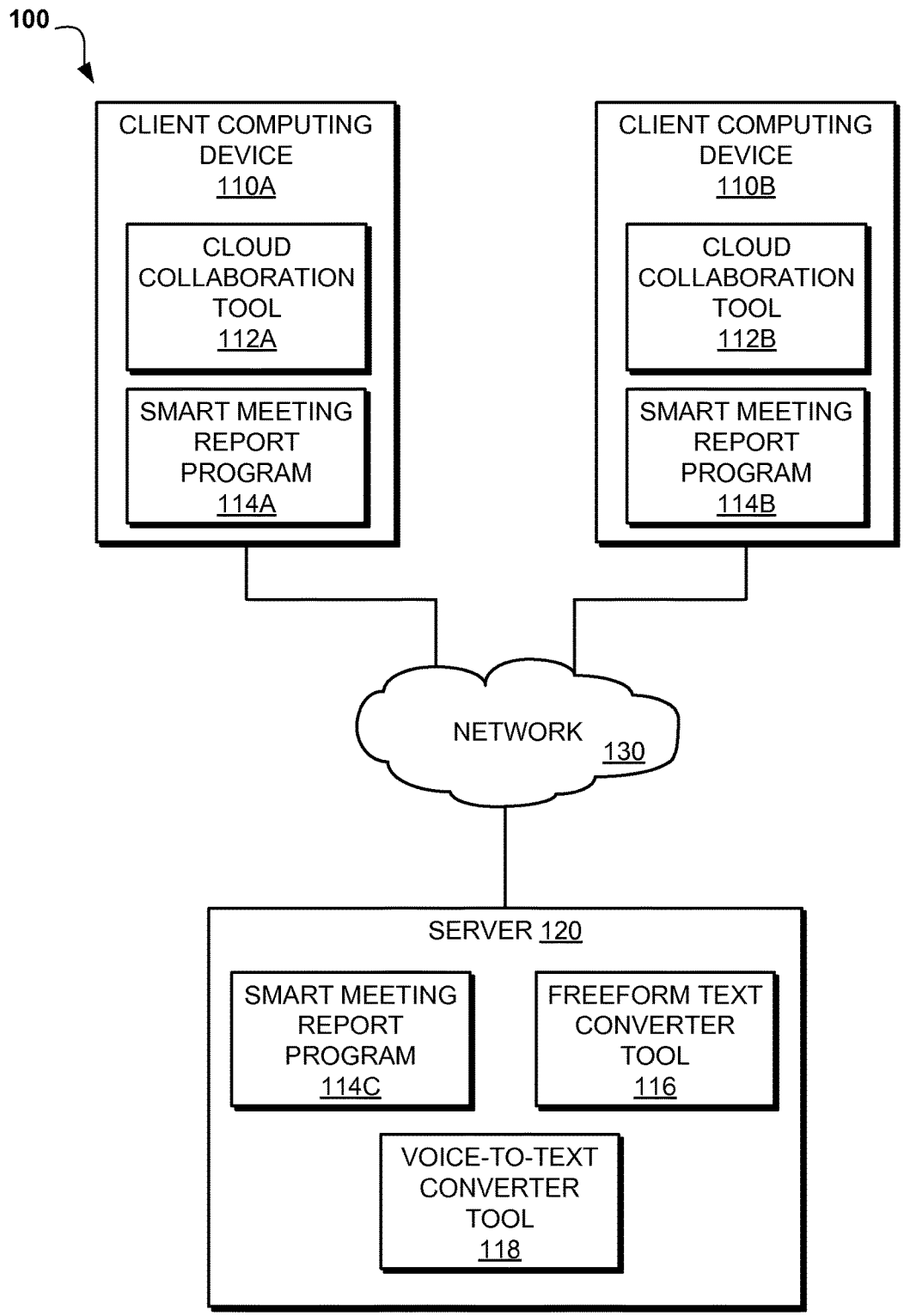
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to meetings, such as online meetings, virtual meetings, or in-person meetings. The following described exemplary embodiments provide a system, method, and program product to, among other things, generate structured meeting reports based on semantic correlation of unstructured voice and text data.

As previously described, virtual meeting software, such as IBM® SmartCloud Meetings, may be utilized to host virtual meetings or online meetings by establishing connections between each meeting participant and allowing participants to interact through various forms, such as a chat room, a video feed of each participant, and an interactive virtual workspace. Manually collecting and consolidating discussion points and meeting minutes from meetings may be tedious and unduly encumber resources due to the amount of notes recorded during a meeting and each meeting participant potentially present in a separate location. Additionally, when less than all meeting participants are present at the meeting location, each participant may be required to record his or her own notes.

Generally, audio and video recordings may be captured by a meeting moderator for reference by meeting participants after the conclusion of the meeting. However, these recordings may not emphasize specific points of interest. Therefore, if a meeting participant is interested in a particular topic discussed during the meeting, the participant may be required to replay the complete recording of the meeting to collect the desired information since a topic may have been discussed at various times during the meeting.

Additionally, many meeting participants typically write down notes during a meeting for future reference. In other situations, a single meeting participant is charged with the task of recording meeting minutes. Whether each individual records their own personal meeting notes or a single participant bears the burden of recording meeting minutes, important meeting points may be missed or recorded incorrectly due to the individual recording the meeting notes focusing on recording the meeting notes while concurrently listening to the meeting. For example, meeting minutes may record key decisions made during the meeting, but omit the arguments and discussions between the meeting participants that led to the decisions. Furthermore, recordation of meeting notes and minutes by individual meeting participants may result in incomplete notes since a meeting participant may be more focused on a particular meeting discussion and less interested in another meeting discussion due to that participant's work focus and meeting interests. For example, an accountant recording notes during a company marketing meeting may be more interested in discussions related to marketing cost figures rather than topics related to target market outreach strategies. Therefore, the accountant recording the meeting notes may record detailed notes for the discussions related to cost figures but only general notes for target market outreach strategies. If a member of the company marketing department review the notes taken by the accountant, an incomplete picture of the meeting discussions may be presented.

Furthermore, some meetings may allow participants to share structured media content, such as a PowerPoint® (PowerPoint and all PowerPoint-based trademarks and logos are trademarks or registered trademarks of Microsoft Corporation and/or its affiliates) presentation slide-by-slide, which may allow for easy note taking due to a linear discussion through the shared media content. However, many meetings may allow for unstructured participant discussions, such as brainstorming sessions, where consolidation of meeting minutes may be more complex due to the nonlinear nature of the meeting discussion. As such, it may be advantageous, among other things, to implement a system that is capable of generating an integrated, structured meeting report using semantic correlation of unstructured voice and text data.

According to one embodiment, participants, or users, in a meeting may connect to a cloud-based meeting platform using a mobile device, such as a laptop, tablet, or smartphone. Each meeting participant may interact with other meeting participants through collaborative software, such as voice chat and an interactive common screen meeting console. During the course of the meeting, text and other graphics written on the meeting console, such as freeform graphics, and voice spoken through mobile devices may be captured in real time. The captured text and voice data may be converted, correlated, and combined using an intelligence engine to create a structured meeting report from an unstructured meeting room discussion and distribute customized meeting reports to subscribers in a preconfigured format.

Therefore, embodiments of the present invention may have the capacity to improve the technical field of meetings by enhancing the user experience and effectiveness of meeting discussions since structured and customized reports may be created with comprehensive meeting details. Additionally, the multiple structured meeting reports for an organization may be analyzed to determine guidelines and organizational statistics, such as meeting patterns, meeting effectiveness, emotional analysis, and best practices. Furthermore, since text and voice data associated with the meeting is captured and compiled into a structured report, any individual unable to participate in the meeting may subscribe to the meeting and receive a structured meeting report. The structured meeting report may allow a non-participant of the meeting to obtain a clear perspective of the various discussions, arguments, and decisions may by the meeting participants.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 is depicted, in accordance with one embodiment. The networked computer environment 100 may include client computing device 110A, 110B and server 120 interconnected via communication network 130. According to at least one implementation, networked computer environment 100 may include a plurality of client computing devices 110A, 110B and servers 120. For illustrative brevity, only two client computing devices 110A, 110B and one server 120 are shown.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110A, 110B may be, for example, a mobile device, a telephone, a personal digital assistant, a netbook, a laptop computer, a tablet computer, a desktop computer, or any type of computing device capable of running a program and accessing a network. Client computing device 110A, 110B may be capable of hosting cloud collaboration tool 112A, 112B and smart meeting report program 114A, 114B.

Server computer 120 may be a laptop computer, netbook computer, personal computer (PC), a desktop computer, or any programmable electronic device capable of hosting smart meeting report program 114C, freeform text converter tool 116, voice-to-text converter tool 118, and communicating with client computing device 110A, 110B via network 130, in accordance with embodiments of the invention. As will be discussed with reference to FIG. 6, server computer 120 may include internal components 602a and external components 604a, respectively, and client computing device 110A, 110B may include internal components 602b and external components 604b, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, cloud collaboration tool 112A, 112B may be a program capable of hosting a meeting in a cloud-based environment, such as IBM® SmartCloud Meetings and Skype@ (Skype and all Skype-based trademarks and logos are trademarks or registered trademarks of Microsoft Corp. and/or its affiliates). Cloud collaboration tool 112A, 112B may include voice chat, video chat, instant messaging, and collaborative markup tools. Cloud collaboration tool 112A, 112B may present each user with access to a common graphical user interface for inputting text or pictures and freeform writing text or drawing objects using a rich set of tools to create a similar experience across all graphical user interfaces. Cloud collaboration tool 112A, 112B is explained in further detail below with respect to FIG. 2.

According to the present embodiment, freeform text converter tool 116 may be a tool capable of recording written content, such as text and diagrams, input to the meeting console of cloud collaboration tool 112A, 112B along with timeline data, positional data, and structural data for each diagram and item of text recorded. The timeline data may specify the time and sequence when content was written. The positional data may specify the location of the content, such as text in the center, left, or right side of the page. The structural data may specify properties of the content, such as whether the text is bulleted or numbered, included as part of a list or diagram, and section information.

According to the present embodiment, voice-to-text converter tool 118 may be a program capable of recording user voices spoken while interacting on cloud collaboration tool 112A, 112B and converting the recorded audio to digital text, or audio-text. Voice-to-text converter tool 118 may capture the discussion among all users in real time. Voice-to-text converter tool 118 may capture timeline data, which may specify when specific items of voice data were recorded during the meeting.

According to the present embodiment, smart meeting report program 114A, 114B, 114C may be a program capable of creating a structured report using the captured typed content, freeform content converted by freeform text converter tool 116, and audio content converted to audio-text by voice-to-text converter tool 118. Smart meeting report program 114A, 114B, 114C is explained in further detail below with respect to FIG. 3.

Figure 2:
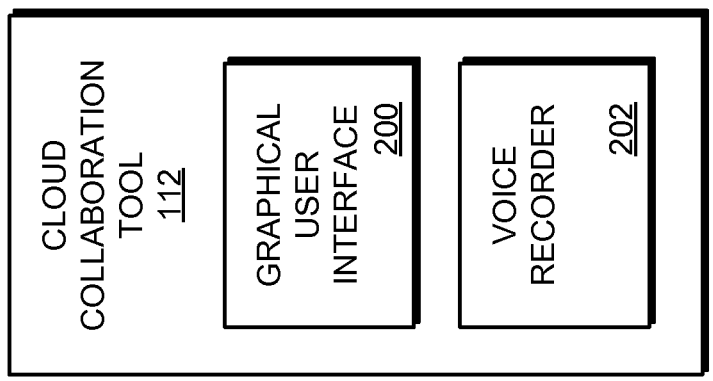
FIG. 2 is a functional block diagram illustrating the components of a cloud collaboration tool, in accordance with one embodiment of the present invention.

Referring now to FIG. 2, a functional block diagram illustrating the components of cloud collaboration tool 112A, 112B is depicted, in accordance with one embodiment of the present invention. Cloud collaboration tool 112A, 112B may include graphical user interface 200 and voice recorder 202. Graphical user interface 200 may be an interactive medium for each user to input text or diagrams to cloud collaboration tool 112A, 112B while engaging in a meeting. Voice recorder 202 may be capable of capturing user voices as audio data spoken during a meeting.

Figure 3:
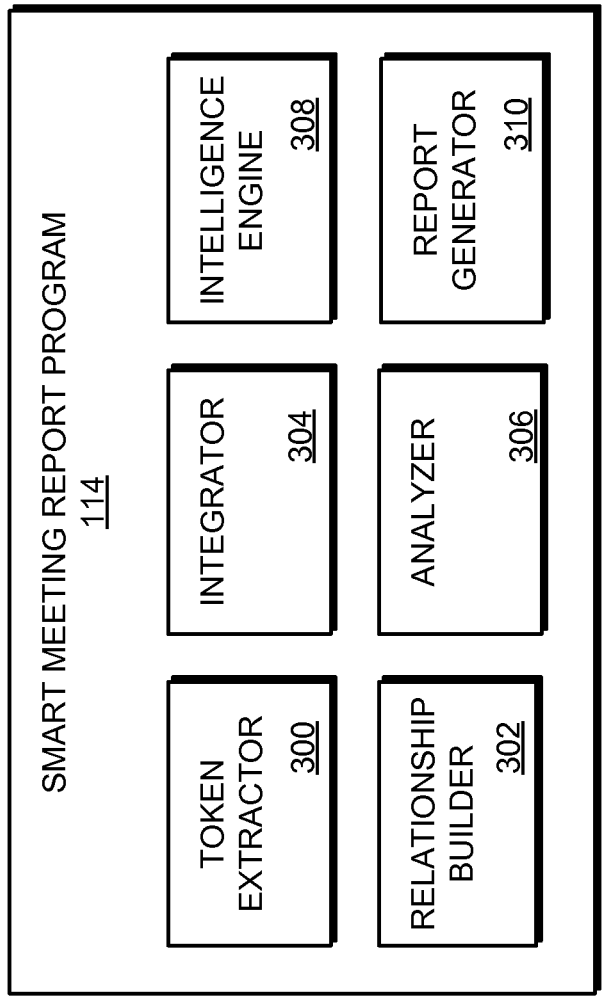
FIG. 3 is a functional block diagram illustrating the components of a smart meeting report program, in accordance with one embodiment of the present invention.

Referring now to FIG. 3, a functional block diagram illustrating the components of a smart meeting report program is depicted, in accordance with one embodiment of the present invention. Smart meeting report program 114A, 114B, 114C may include token extractor 300, relationship builder 302, integrator 304, analyzer 306, intelligence engine 308, and report generator 310.

Token extractor 300 may be software capable of extracting text tokens from digital text and diagrams and recorded audio based on predefined text characteristics, such as bulleted, listed, and numbered text, headings, sections, and side notes. A token may be a keyword or a tag associated with a particular item of text, a graphical object, or a clip of audio. For example, if a sentence of typed content relates to a budget discussion during a virtual staff meeting, the token extracted from the sentence may be "budget". Token extractor 300 may be able to determine the text tokens through the structural data or positional data of the captured text. For example, if a heading of text relates to employee healthcare benefits, then token extractor 300 may determine each bulleted line of text below the heading also relates to employee healthcare benefits and token extractor 300 may extract the same token for both the heading and each bullet below the heading. Token extractor 300 may extract tokens from graphical objects by analyzing graphical sub components of each graphical object. For example, it a graphical object is a bar chart relating to employee vacation time taken per month, token extractor 300 may analyze chart headings to determine the token to be extracted from the graphical object.

Relationship builder 302 may be software capable of constructing relations between extracted tokens. For example, since descriptive text written alongside a diagram may be associated with the diagram, relationship builder 302 may associate the descriptive text with the diagram so a structured report may properly display the related content.

Integrator 304 may be software capable of integrating captured timeline data, positional data, and structural data. Integrator 304 may associate the captured timeline data, positional data, and structural data with each token extracted by token extractor 300.

Analyzer 306 may be software capable of categorizing the audio data converted to audio-text by voice-to-text converter tool 118. Since the audio text, once categorized, remains in fragments of natural language text, analyzer 306 may then create a semantic relatedness between the audio-text fragments so that tokens may be extracted by token extractor 300.

Intelligence engine 308 may be capable of using analytics to correlate unstructured text tokens, graphical object tokens, and audio tokens. Intelligence engine 308 may create an association between tokens based on token semantics and timeline data. For example, intelligence engine 308 may be capable of determining a discussion between meeting participants relates to a freeform diagram drawn in cloud collaboration tool 112A, 112B. Therefore, intelligence engine 308 may correlate the audio-text token associated with the voice discussion and the graphical object token associated with the diagram so a structured report properly displays the discussion of the diagram with the visual representation of the diagram.

Report generator 310 may be software capable of creating a structured outline of the meeting report using the positional data and structural data of the text tokens. Furthermore, report generator 310 may generate a structured meeting report by populating the structured outline using the contents of the associated text tokens, graphical object tokens, and audio-text tokens. Report generator 310 may create the structured report in a variety of document formats, such as .pdf and .doc file formats.

Figure 4A:
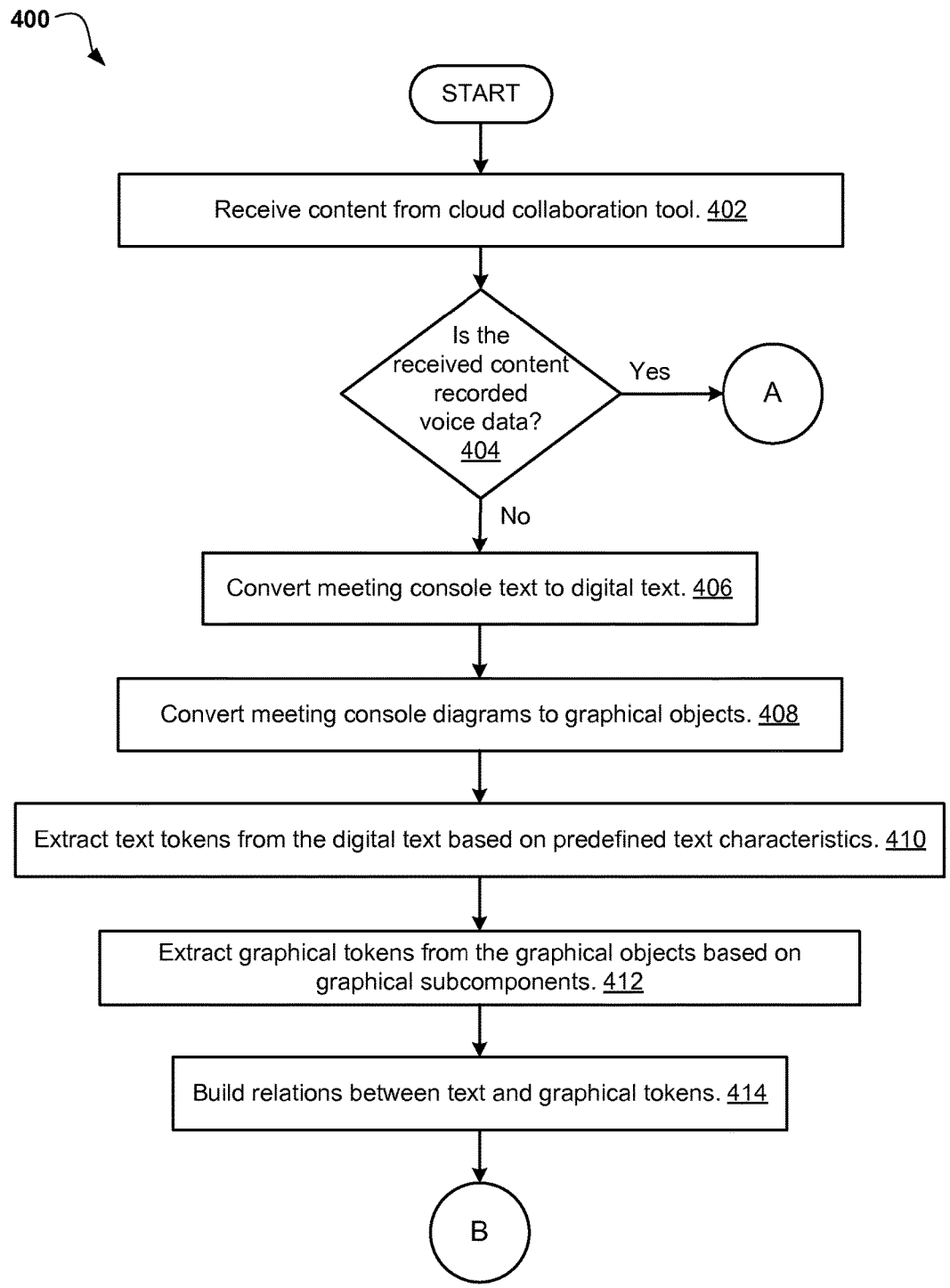
FIGS. 4A-4C illustrate a flowchart of the operational steps carried out by a program to generate structured meeting reports, in accordance with one embodiment of the present invention.
Figure 4B:
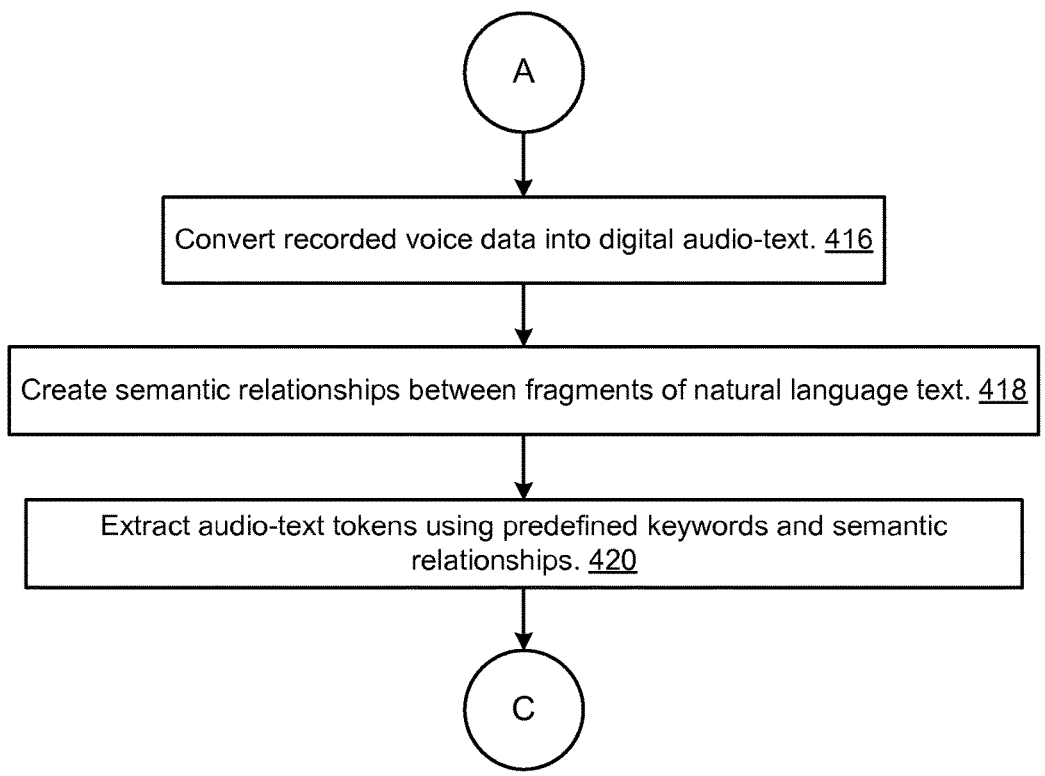
Figure 4C:
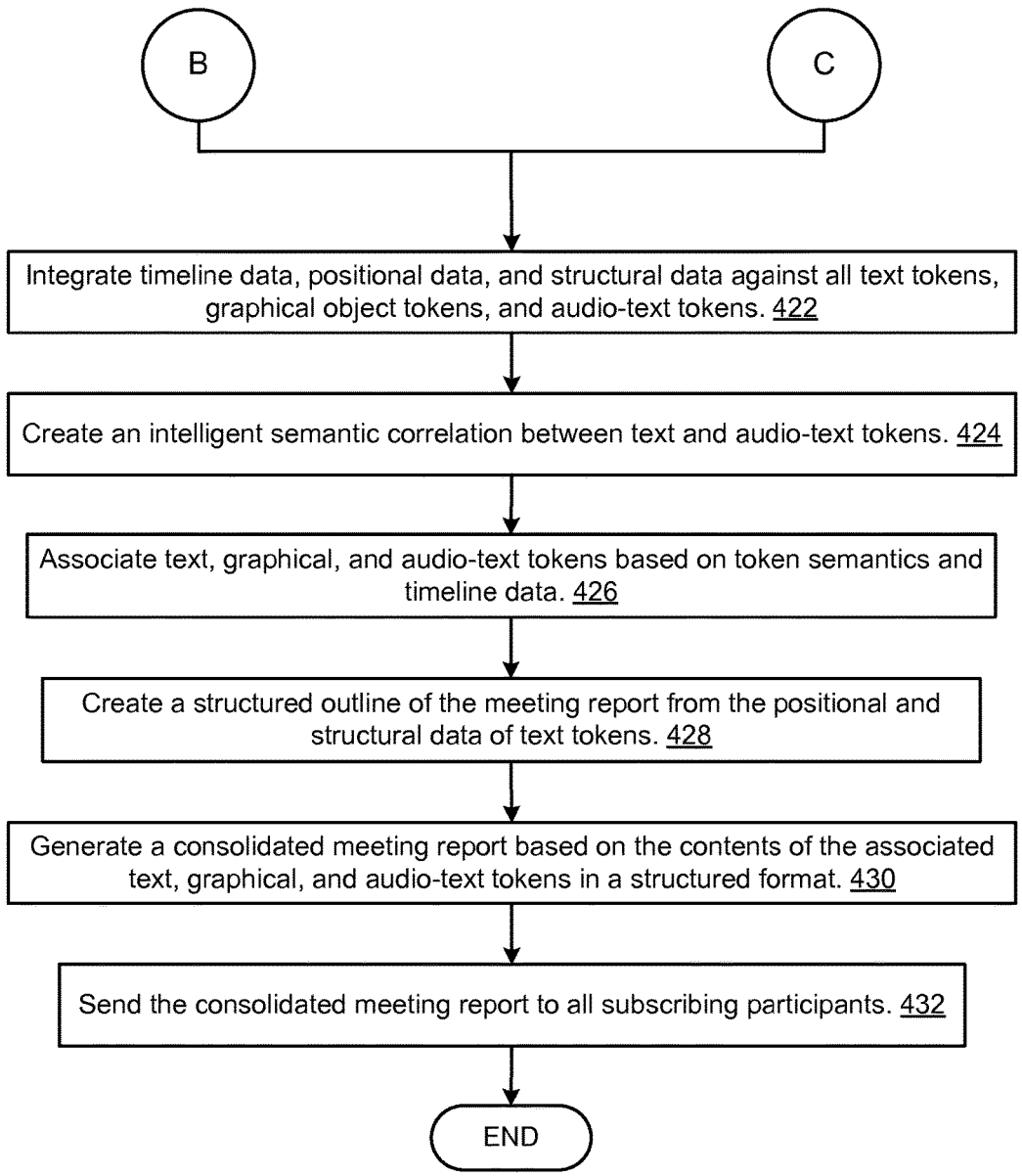

Referring now to FIGS. 4A-4C, a flowchart 400 illustrating the operational steps carried out by a program to generate structured meeting reports is depicted, in accordance with one embodiment of the present invention. Referring to FIG. 4A, at 402, content, such as audio data and text data, may be received by a computer hosting smart meeting report program 114A, 114B, 114C. Text data, such as typed content, freeform written text, and diagrams, entered by meeting participants using graphical user interface 200 in cloud collaboration tool 112A, 112B may be recorded along with textual timeline data, structural data, and positional data. Similarly, audio data, such as user voices, may be recorded, along with audio timeline data, by voice recorder 202 in cloud collaboration tool 112A, 112B in order to capture the voice discussions between users during the meeting.

Next at 404, the computer determines whether the received content is recorded audio data. If, at 404, the computer determines the received content is recorded audio data, then the method may continue to step 416 to convert the recorded audio data into digital audio-text. If, at 404, the computer determines the received content is not recorded audio data, then the received content may be recorded text data and the method may continue to step 406 to convert the received text data to digital text.

Then at 406, freeform text converter tool 116 may convert the received freeform text to digital text. During the course of a meeting, users may input text data, such as freeform text and typed text into graphical user interface 200 in cloud collaboration tool 112A, 112B. Since the received freeform text may not be represented in a structured, recognizable font, freeform text converter 116 may convert the received freeform text to digital text. For example, if a meeting participant used a stylus to hand write freeform text into graphical user interface 200 in cloud collaboration tool 112A, 112B, freeform text converter 116 may convert the handwritten text into a structured font, such as Times New Roman font or Arial font. Freeform text converter 116 may not convert typed text content since the typed text content may already exist in a structured font.

Next at 408, freeform text converter tool 116 may convert the received diagrams to graphical objects, such as a .jpeg file. During the course of a meeting, users may insert or create drawings on graphical user interface 200 in cloud collaboration tool 112A, 112B. Since the received diagrams may be unstructured, freeform text converter 116 may convert the freeform diagrams and drawings into graphical objects. For example, if a meeting participant draws a diagram of a graph during a meeting discussion, freeform text converter tool 116 may convert the freeform diagram into a graphical object.

Then at 410, token extractor 300 may extract text tokens from the converted digital text. Once the freeform text has been converted to digital text, tokens may be extracted from the converted freeform text and typed content, which was in digital text form when captured from cloud collaboration tool 112A, 112B. As previously described, a token may be a keyword or a tag associated with a particular item of text, graphical object, or audio clip. For example, if a sentence of typed content relates to a budget discussion during a staff meeting, the token extracted from the sentence may be "budget". Token extractor 300 may extract the tokens based on specific keywords within or tags associated with phrases, sentences, or paragraphs of text or graphical objects. Furthermore, token extractor 300 may extract the text tokens based on preconfigured characteristics, such as bulleted text, listed text, numbered text, and headings. For example, if a heading is followed by bulleted text, token extractor 300 may extract the same token for the bulleted text and the heading since both items of digital text are inherently related. The characteristics of each item of digital text may be determined using the structural data and positional data that was recorded with the typed content and freeform content.

Next at 412, token extractor 300 may extract graphical object tokens from the converted graphical objects. For example, if a converted graphical object is a bar graph of total employee vacation time taken per month, token extractor 300 may extract a "vacation" token from the graphical object. Furthermore, token extractor 300 may extract the graphical object tokens based on graphical subcomponents of the graphical objects. For example, with respect to the previously mentioned employee vacation bar graph, token extractor 300 may extract "date" tokens or "month" tokens for each of the graph headings related to each month employees take vacation time.

Then at 414, relationship builder 302 may construct relationships between the extracted text tokens and the extracted graphical object tokens, as applicable. For example, if a bullet of text was written to describe a particular piece of a diagram, relationship builder 302 may build a relationship between the bullet of text and the piece of the diagram so that those two items may be properly displayed together in a structured meeting report.

Referring now to FIG. 4B, at 416, voice-to-text converter tool 118 may convert the recorded audio data into audio-text. Audio-text may be a visual transcription into a digital text, such as Times New Roman font or Arial font, of the words spoken by users during the meeting hosted by cloud collaboration tool 112A, 112B. For example, a clip of audio data may be captured that relates the sentence "the marketing budget for next year will be $10,000." The clip of audio may be converted to digital audio-text by voice-to-text converter 118 so the sentence may be displayed in a structured report.

Next at 418, the converted audio-text is processed by analyzer 306 in order to categorize the audio-text and creates semantic relationships between the fragments of natural language text. When the audio data is converted to audio-text by voice-to-text converter 118, the audio-text is not semantically related so that natural language text can be formed. In order to form natural language so that tokens can be extracted from the audio-text, the audio-text may be categorized and semantically related. For example, when the audio clip "the marketing budget for next year will be $10,000" is converted to audio-text, each word or phrase of the sentence is understood separately. Token extractor 300 may not be able to properly extract a token from the converted sentence since token extractor 300 only recognizes the sentence as a number of unrelated words and sentences. In order for token extractor 300 to properly extract tokens from the audio-text, analyzer 306 may semantically relate each word and phrase within the sentence. Semantically relating the converted audio-text may allow token extractor 300 to understand the sentence as a whole rather than individual words and phrases. Furthermore, analyzer 306 may build structure to the audio-text. For example, if a meeting participant verbally discusses a list of points, analyzer 306 may semantically relate the audio-text into a bulleted list.

Next at 420, token extractor 300 extracts audio-text tokens based on the created semantic relationships and predefined keywords, such as title, diagram, and list. Similar to step 410 and step 412, token extractor 300 may extract tokens from the converted audio-text. For example, if the audio-text includes the sentence "the marketing budget for next year will be $10,000", token extractor 300 may extract the token "marketing" or "budget" from the audio-text since the audio-text sentence relates to marketing and, more specifically, the marketing budget.

Referring now to FIG. 4C, at 422, integrator 304 may integrate metadata, such as the timeline data, positional data, and structural data, available with each of the audio-text tokens, text tokens, and graphical object tokens. When tokens are captured, no context or detail is included to properly understand the information represented by the token within the course of the meeting. For example, a text token relating to a budget plan may not have any information relating to when during the meeting that token was discussed, where on the community workspace the token was discussed, and any structural information relating to the notes taken for the token, such as underlining, bulleting, or highlighting. In order to provide proper context and detail to each token, integrator 304 may add the timeline data, positional data, and structural data captured for each audio-text token, text, token, and graphical object token. For example, the previously mentioned budget plan text token may have structural data showing the notes taken about the budget plan written in red in Arial font, timeline data indicating the budget plan notes generated five minutes into the meeting, and positional data showing the notes taken about the budget plan are located in the upper left corner of a workspace. By combining the timeline data, positional data, and structural data, integrator 304 may allow a user to better understand the context and flow of the meeting.

Next at 424, intelligence engine 308 may create semantic correlations between the unstructured text tokens and audio-text tokens. The text tokens and audio-text tokens may not be relatable to each other despite relating to similar topics. For example, an audio-text token may correspond to a marketing budget discussion and a text token may correspond to notes taken by a meeting participant relating to the marketing budget. Intelligence engine 308 may create a semantic correlation between the text token and the audio-text token corresponding to the marketing budget discussion since those tokens are inherently linked to one another. Furthermore, intelligence engine 308 may use techniques, such as machine learning algorithms and analytics tools, to create the correlations between the text tokens and audio-text tokens.

Then at 426, intelligence engine 308 may create associations between related text tokens, graphical object tokens, and audio-text tokens. Once correlations between related text tokens and audio-text tokens have been established, intelligence engine 308 may associate each text token, graphical object token, and audio-text token to the timeline data. Associating the text tokens, graphical object tokens, and audio-text tokens may enable conversion of the unstructured text and audio contents of a discussion into a structured format. For example, if a marketing budget discussion included a voice discussion between participants, a diagram drawing, and text notes taken, intelligence engine 308 may associate the tokens associated with each event based on the semantic correlations and the timeline data in order to allow a structured report to properly convey the context in which the marketing budget was discussed.

Then at 428, report generator 310 may create a structured outline of the meeting report from the positional data and the structural data of text tokens. Depending on the information provided in the positional and structural data, report generator 310 may create a uniform template on which to generate a customized meeting report for each user. For example, if a budget plan notes were written in the upper left portion of the workspace and ten bullets were enumerated for that topic, report generator 310 may allocate an appropriate amount of space in the template to accommodate the written text and diagrams associated with the budget plan topic. Similarly, report generator 310 may allocate less space in the report outline for a discussion topic with only one or two bullets and was not written with any font effects, such as underline or bold since such a topic may not have been the focus of the meeting.

Next at 430, report generator 310 may generate a consolidated, integrated meeting report based on the contents of the associated text tokens, graphical object tokens, and audio-text tokens in the structured outline. Once report generator 310 creates the report template, report generator 310 may populate the template with the text tokens, graphical object tokens, and audio-text tokens. Each token may be populated into the area of the template associated with that token. For example, all text tokens, graphical object tokens, and audio-text tokens associated with a budget plan may be populated into the portions of the template allocated to the budget plan discussion. Furthermore, report generator 310 may create a report based on user preferences specific to each user subscribing to the meeting. For example, if a user subscribing to the meeting is an accountant, the user may be more interested in budget related discussions during the meeting. However, a marketing employee may be more interested in the substance of discussions related to marketing outreach efforts discussed during the meeting. By understanding user preferences, report generator 310 may be capable of tailoring each consolidated, integrated meeting report to the specific preferences of each subscribing user.

Then at 432, smart meeting report program 114A, 114B, 114C may distribute the consolidated meeting report to users. A user may subscribe to receive structured meeting reports created by smart meeting report program 114A, 114B, 114C. In order to receive a structured meeting report, a user may subscribe to the meeting report when a meeting invitation is received by the user. Furthermore, a meeting non-participant, such as a high level manager or an individual unable to attend the meeting, may be sent the structured meeting report. Furthermore, consolidated meeting reports may be converted into a variety of document formats, such as .pdf and .doc file formats, based on preconfigured user preferences.

It may be appreciated that FIGS. 4A-4C provide only an illustration of one implementation and do not imply any limitations with regard to how different embodiments may be implemented. Many modifications to the depicted environments may be made based on design and implementation requirements. For example, in another embodiment of the present invention, emotional data related to each meeting participant may be gathered using an emotion analytics engine, such as Beyond Verbal Emotions Analytics® (Beyond Verbal Emotions Analytics and all Beyond Verbal Emotions Analytics-based trademarks and logos are trademarks or registered trademarks of Beyond Verbal Communications Ltd. and/or its affiliates) engine. The emotion analytics engine may be used to analyze the emotions of meeting participants in order to incorporate such data into the structured meeting report.

Figure 5:
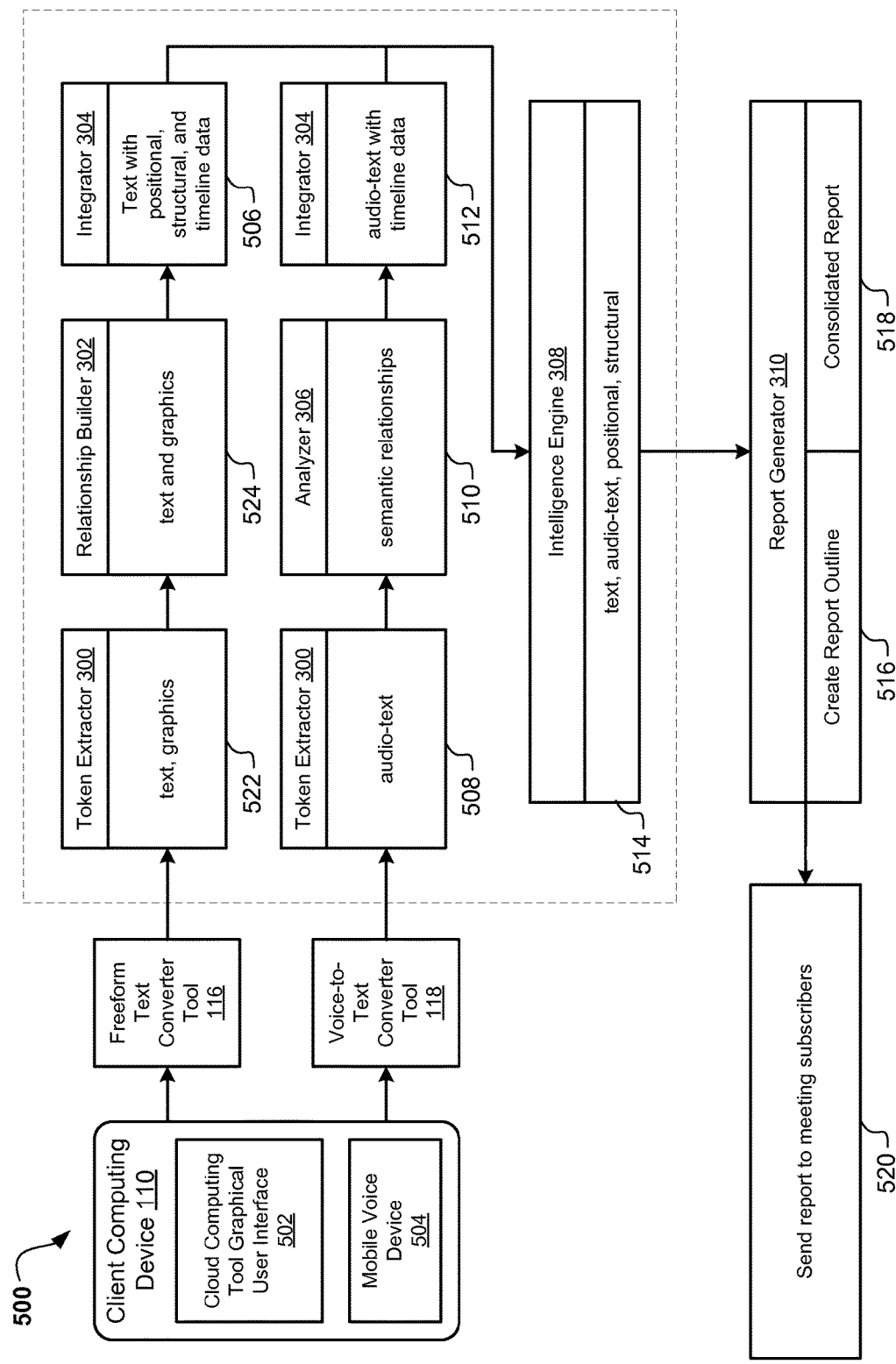
FIG. 5 is a functional block diagram illustrating the steps carried out by a smart meeting report system, in accordance with one embodiment of the present invention.

Referring now to FIG. 5, a functional block diagram 500 illustrating the steps carried out by a smart meeting report system is depicted, in accordance with one embodiment of the present invention. When a user participates in a meeting hosted on client computing device 110A, 110B, user interactions on the cloud computing tool graphical user interface 502 and mobile voice device 504 may be captured. Then, freeform text converter tool 116 may convert captured typed content, freeform text, and diagrams into unrelated digital text, such as text and graphical objects 522, and voice-to-text converter tool 118 may convert captured audio to audio-text 508. Next, token extractor 300 may extract tokens from the unrelated text and graphics 522 and audio-text 508. Then, relationship builder 302 may construct relationships between unrelated text and graphics 522 to create related text and graphics 524. Next, analyzer 306 may categorize audio-text 508 and create sematic relationships 510 between the fragments of natural language audio-text 508. Then, integrator 304 may combine the related text and graphics 524 with positional data, structural data, and timeline data 506. Next, integrator 304 may combine the semantically related audio-text 510 with timeline data 512. Then, intelligence engine 308 may correlate and converge the text tokens and audio-text tokens associated with positional data, structural data, and timeline data 514. Next, report generator 310 may create a report outline 516, which is an outline of the final consolidated report. Then, report generator 310 creates a consolidated report 518 from report outline 516. Next, consolidated report 518 may be sent to meeting subscribers 520 through a preconfigured medium, such as email, text message, or instant message.

Figure 6:
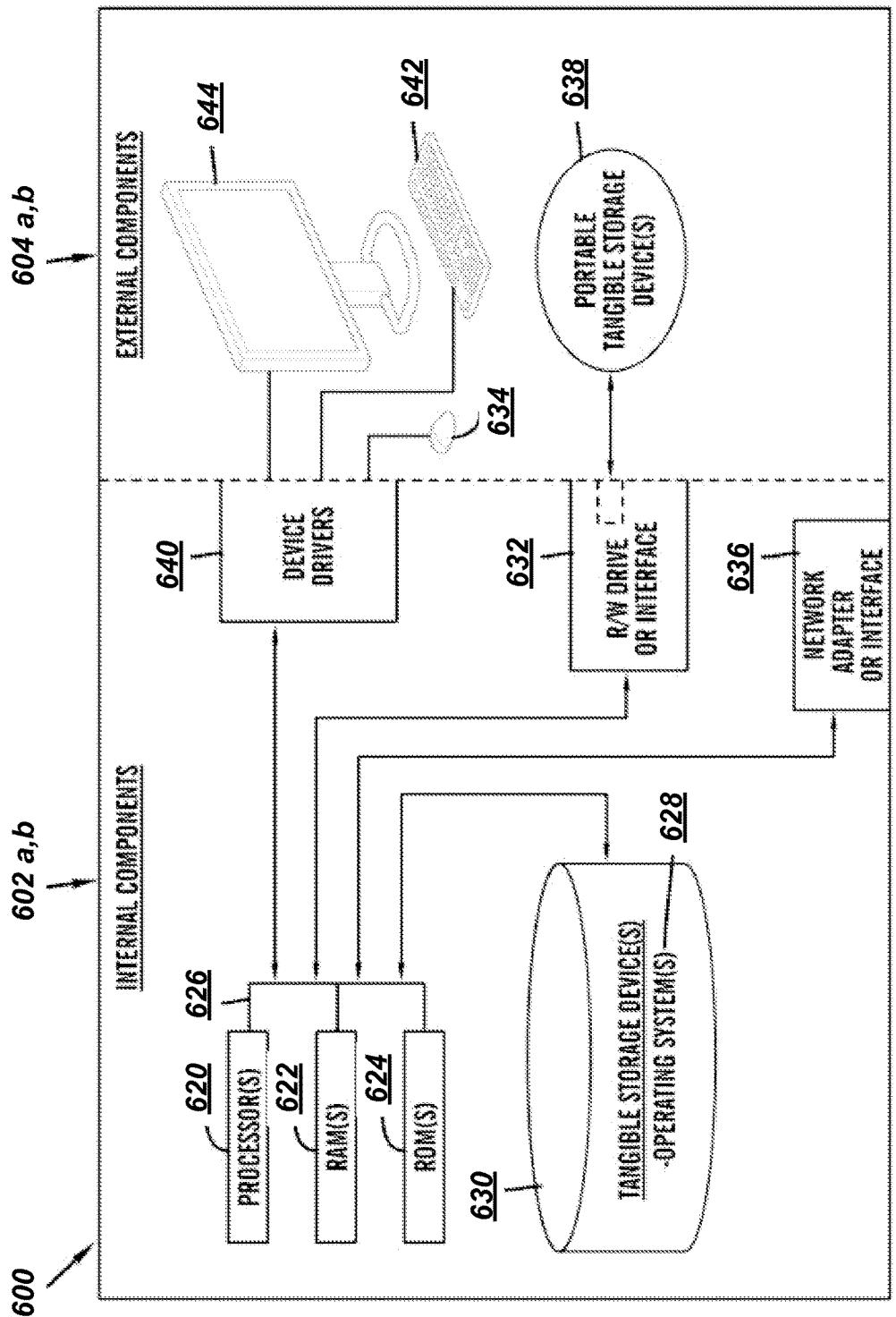
FIG. 6 depicts a cloud computing node according to an embodiment of the present invention.

FIG. 6 is a block diagram 600 of internal and external components of computer 110A, 110B and server 120 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602, 604 is representative of any electronic device capable of executing machine-readable program instructions. Data processing system 602, 604 may be representative of a smart phone, a computer system, PDA, or other electronic devices. Examples of computing systems, environments, and/or configurations that may be represented by data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110A, 110B and network server 120 may include respective sets of internal components 602 *a,b* and external components 604 *a,b* illustrated in FIG. 6. Each of the sets of internal components 602 include one or more processors 620, one or more computer-readable RAMs 622 and one or more computer-readable ROMs 624 on one or more buses 626, and one or more operating systems 628 and one or more computer-readable tangible storage devices 630. The one or more operating systems 628; cloud collaboration tool 112A, 112B and smart meeting report program 114A, 114B in client computer 110A, 110B; and the smart meeting report program 114C, freeform text converter tool 116, and voice-to-text converter tool 118 in network server 120 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 *a,b* also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as smart meeting report program 114A, 114B, 114C can be stored on one or more of the respective portable computer-readable tangible storage devices 638, read via the respective R/W drive or interface 632 and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. Smart meeting report program 114A, 114B in client computer 110A, 110B and smart meeting report program 114C in network server 120 can be downloaded to client computer 110A, 110B and network server 120 from an external computer via a network (for example, the Internet, a local area network or other, wide area network) and respective network adapters or interfaces 636. From the network adapters or interfaces 636, smart meeting report program 114A, 114B in client computer 110A, 110B and smart meeting report program 114C in network server 120 are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642 and computer mouse 634. The device drivers 640, R/W drive or interface 632 and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
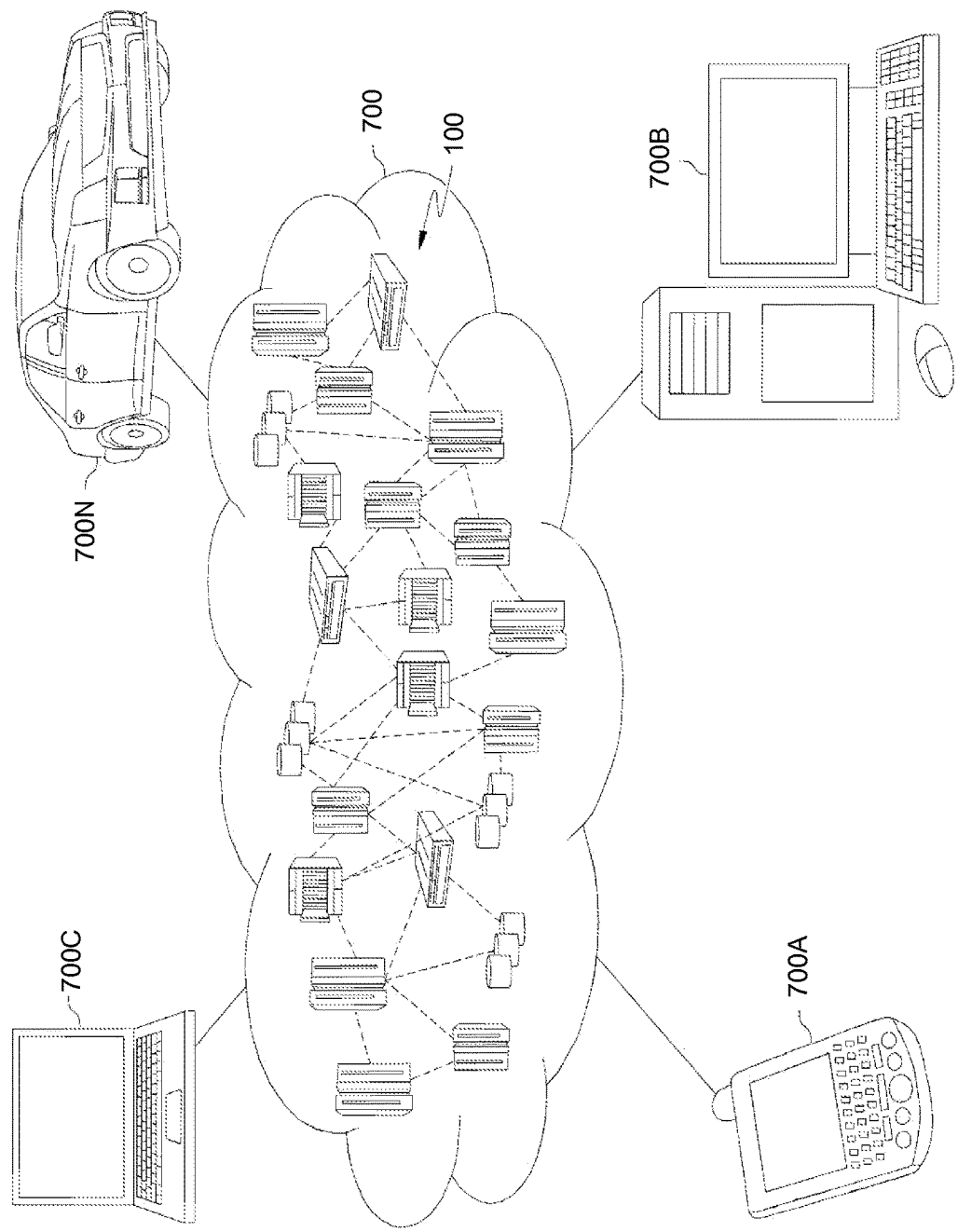
FIG. 7 depicts a cloud computing environment according to an embodiment of the present invention.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
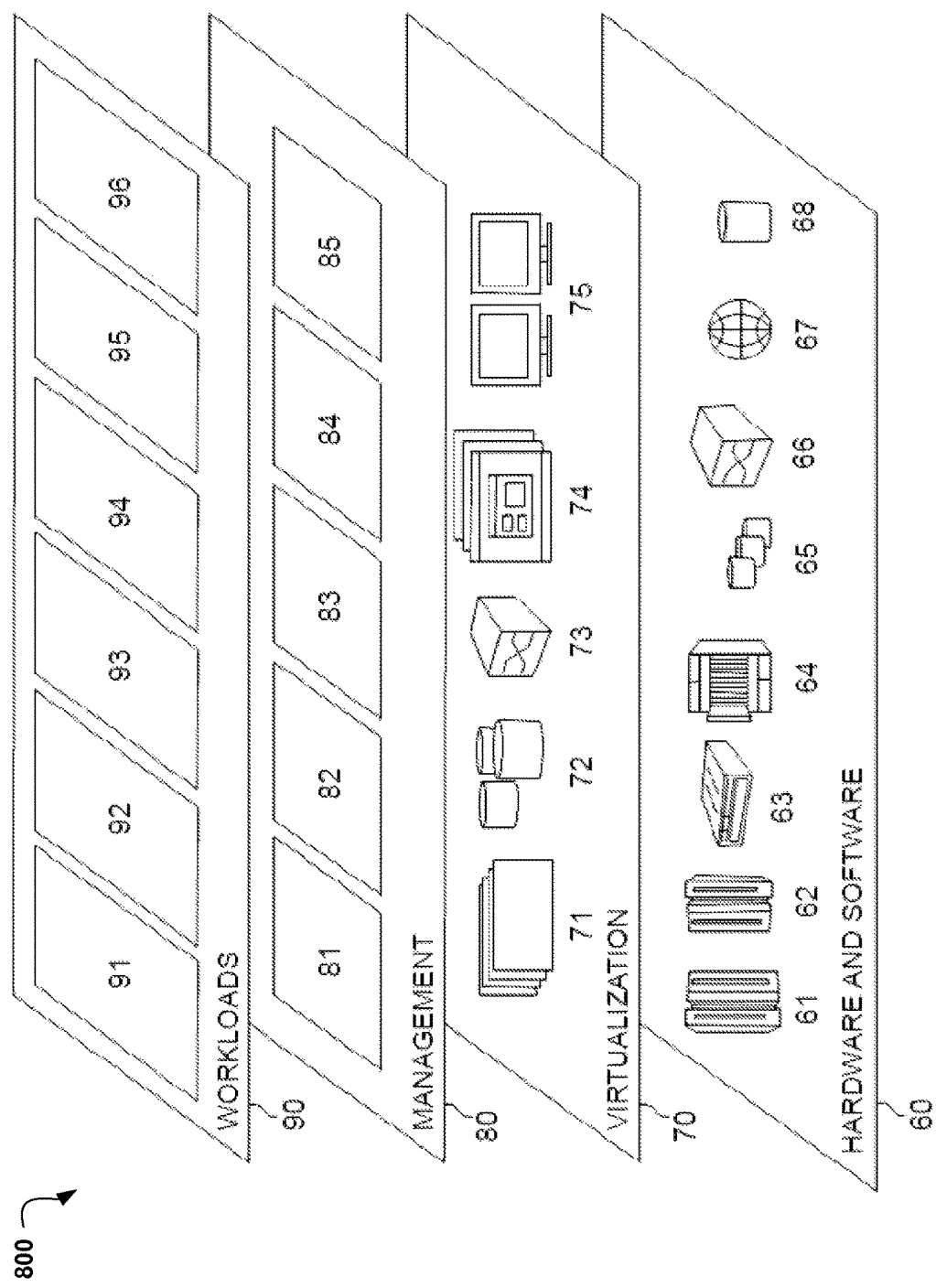
FIG. 8 depicts abstraction model layers according to an embodiment of the present invention.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and structured meeting report generator 96. A structured meeting report generator may allow automatic creation of structured meeting reports using unstructured meeting discussions and notes from cloud based meetings.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for generating a structured meeting report though semantic correlation of unstructured voice and text data, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by a first computer, a plurality of data associated with a virtual meeting, wherein the plurality of data comprises a plurality of audio data, a plurality of video data, a plurality of timeline data, a plurality of structural data, a plurality of meeting participant emotional data, and a plurality of positional data transmitted between a second computer and the first computer during the virtual meeting, wherein the plurality of meeting participant emotional data is gathered by an emotion analytics engine;

at a time of reception of the plurality of data during the virtual meeting, converting, simultaneously, the received plurality of data to a plurality of audio text data, a plurality of digital text data, and a plurality of graphical object data;

identifying a plurality of tokens associated with at least one of the converted plurality of audio text data, the converted plurality of digital text data, and the converted plurality of graphical object data, wherein identifying the plurality of tokens further comprises:

extracting, by a token extractor, one or more text tokens from the plurality of digital text data based on a plurality of predefined text characteristics, wherein the plurality of predefined text characteristics are a plurality of bulleted text, a plurality of listed text, a plurality of numbered text, and one or more headings;

extracting, by the token extractor, one or more graphical object tokens from the plurality of graphical object data based on one or more graphical subcomponents of each graphical object within the plurality of graphical object data; and building one or more relations between the one or more extracted text tokens and the one or more extracted graphical object tokens;

integrating each token within the identified plurality of tokens corresponding to at least one of the plurality of timeline data, the plurality of positional data, and the plurality of structural data;

creating a plurality of semantic correlations using a machine learning algorithm by connecting a plurality of tokens associated with the converted plurality of audio text data and a plurality of tokens associated with the converted plurality of digital text data to extract, by the token extractor, one or more audio text tokens from the created plurality of semantic correlations;
associating each of the integrated tokens with a semantic correlation within the created plurality of semantic correlations based on the plurality of timeline data;
creating a report outline based on the plurality of positional data and the plurality of structural data of the text tokens;
creating a report template based on the plurality of positional data and the plurality of structural data;
creating an integrated report based on the created report template and the outline, wherein the template is populated with the extracted one or more graphical object tokens, audio text tokens and text tokens, wherein the created integrated report is tailored to an occupation or a job title of a user; and
transmitting the created integrated report to a meeting non-participant that has subscribed to a report distribution list for the virtual meeting.

2. The computer system of claim 1, further comprising:
determining at least one subscriber to the virtual meeting; and
distributing the report to the at least one subscriber.

3. The computer system of claim 2, wherein the at least one subscriber is at least one of a meeting participant and a meeting non-participant, and wherein the meeting is the virtual meeting, an online meeting, or an in-person meeting.

4. The computer system of claim 1, wherein the plurality of data includes at least one of a plurality of typed text content, a plurality of freeform written text, a plurality of freeform diagrams, and a plurality of meeting participant voice discussion data recorded over a time period.

5. The computer system of claim 1, further comprising:
receiving a plurality of user emotion data associated with each meeting participant within a plurality of participants associated with the meeting;
integrating the received plurality of user emotion data with the identified plurality of tokens.

6. The computer system of claim 1, wherein creating the integrated report is based on a plurality of preconfigured user preferences.

7. The computer system of claim 1, wherein the received plurality of data is sent from a cloud collaboration tool.

8. A computer program product for generating a structured meeting report though semantic correlation of unstructured voice and text data, the computer program product comprising:
one or more computer-readable tangible storage medium and program instructions stored on at least one of the one or more tangible storage medium, the program instructions executable by a processor, the program instructions comprising:
program instructions to receive, by a first computer, a plurality of data associated with a virtual meeting over a cloud-based meeting platform, wherein the plurality of data comprises a plurality of audio data, a plurality of video data, a plurality of timeline data, a plurality of structural data, a plurality of meeting participant emotional data, and a plurality of positional data transmitted between a second computer and the first computer during the virtual meeting, wherein the plurality of meeting participant emotional data is gathered by an emotion analytics engine;
at a time of reception of the plurality of data during the virtual meeting, program instructions to convert, simultaneously, the received plurality of data to a plurality of audio text data, a plurality of digital text data, and a plurality of graphical object data;
program instructions to identify a plurality of tokens associated with at least one of the converted plurality of audio text data, the converted plurality of digital text data, and the converted plurality of graphical object data, wherein identifying the plurality of tokens further comprises:
program instructions to extract, by a token extractor, one or more text tokens from the plurality of digital text data based on a plurality of predefined text characteristics, wherein the plurality of predefined text characteristics are a plurality of bulleted text, a plurality of listed text, a plurality of numbered text, and one or more headings;
program instructions to extract, by the token extractor, one or more graphical object tokens from the plurality of graphical object data based on one or more graphical subcomponents of each graphical object within the plurality of graphical object data; and
program instructions to build one or more relations between the one or more extracted text tokens and the one or more extracted graphical object tokens;
program instructions to integrate each token within the identified plurality of tokens corresponding to at least one of the plurality of timeline data, the plurality of positional data, and the plurality of structural data;
program instructions to create a plurality of semantic correlations using a machine learning algorithm by connecting a plurality of tokens associated with the converted plurality of audio text data and a plurality of tokens associated with the converted plurality of digital text data to extract, by the token extractor, one or more audio text tokens from the created plurality of semantic correlations;
program instructions to associate each of the integrated tokens with a semantic correlation within the created plurality of semantic correlations based on the plurality of timeline data;
program instructions to create a report outline based on the plurality of positional data and the plurality of structural data of the text tokens;
program instructions to create a report template based on the plurality of positional data and the plurality of structural data;
program instructions to create an integrated report based on the created report template and the outline, wherein the template is populated with the extracted one or more graphical object tokens, audio text tokens and text tokens, wherein the created integrated report is tailored to an occupation or a job title of a user; and
program instructions to transmit the created integrated report to a meeting non-participant that has subscribed to a report distribution list for the virtual meeting.

9. The computer program product of claim 8, further comprising:
program instructions to determine at least one subscriber to the virtual meeting; and
program instructions to distribute the report to the at least one subscriber.

10. The computer program product of claim 9, wherein the at least one subscriber is at least one of a meeting participant and a meeting non-participant, and wherein the meeting is the virtual meeting, an online meeting, or an in-person meeting.

11. The computer program product of claim 8, wherein the plurality of data includes at least one of a plurality of typed text content, a plurality of freeform written text, a plurality of freeform diagrams, and a plurality of meeting participant voice discussion data recorded over a time period.

12. The computer program product of claim 8, further comprising:
   program instructions to receive a plurality of user emotion data associated with each meeting participant within a plurality of participants associated with the meeting;
   program instructions to integrate the received plurality of user emotion data with the identified plurality of tokens.

13. The computer program product of claim 8, wherein creating the integrated report is based on a plurality of preconfigured user preferences.

* * * * *